UNITED STATES PATENT OFFICE.

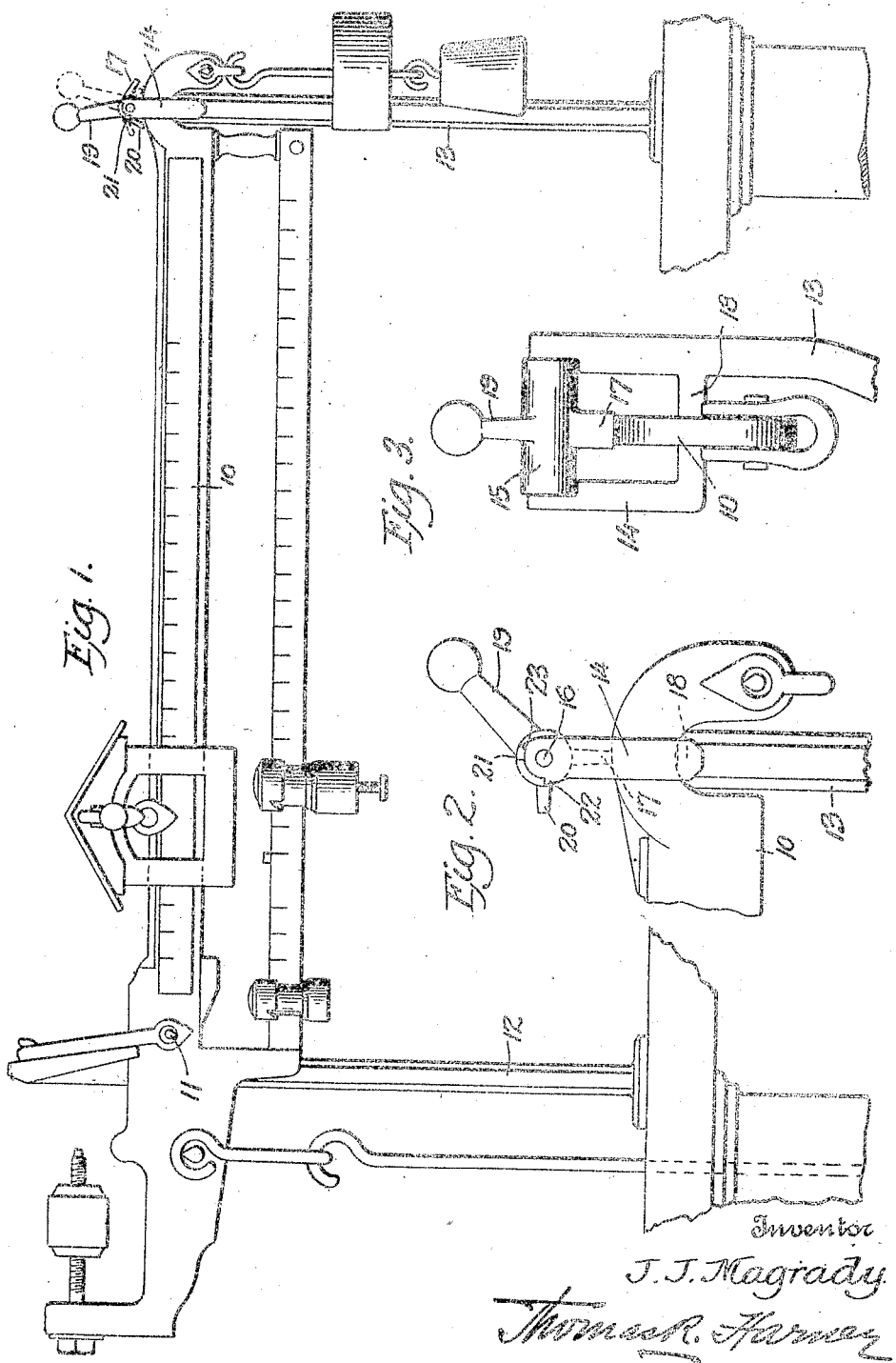

JOSEPH J. MAGRADY, OF CHICAGO, ILLINOIS.

AUTOMATIC LATCH FOR SCALE BEAMS.

1,423,772.  Specification of Letters Patent.  Patented July 25, 1922.

Application filed December 12, 1921. Serial No. 521,807.

*To all whom it may concern:*

Be it known that I, JOSEPH J. MAGRADY, a citizen of the United States of America, residing at Chicago, in the county of Cook and State of Illinois, have invented certain new and useful Improvements in Automatic Latches for Scale Beams, of which the following is a specification.

My present invention relates generally to scales, and more particularly to the movable scale beams of platform scales especially those where the platform is mounted in and constitutes a part of a driveway such as an alley or street, and my object is the provision of means automatically acting upon movement of the scale beam to lock the same against subsequent movement and thus prevent destructive vibration of the scale beam from the passage of persons, vehicles and animals over the platform.

It is a well known fact that manually controlled latch members are usually provided for the above purpose and that these latches depend upon the care and attention of an operator for their effectiveness. It is very often the case that they are not shifted to the effective or latched position after use of the scale and thus the beam chatters back and forth every time a weight passes over the scale platform capable of moving the beam.

My invention aims to avoid these disadvantages by the provision of a device which will not depend for its action or more especially its shifting to effective position, upon the attention and care of an operator but will automatically act to this end upon the first movement of the scale beam to the end that further movements will be prevented.

In the accompanying drawing which illustrates my present invention and forms a part of this specification, Figure 1 is a front elevation illustrating the practical application of my invention, Figure 2 is an enlarged front view of my invention and the parts immediately adjacent thereto, and Figure 3 is a side view of Figure 2.

Referring now to these figures I have shown in Figure 1 certain parts including a movable scale beam 10 which may be of any suitable form and which according to the type at present illustrated is to be found in common use in connection with large platform scales. The fulcrum 11 of the beam is supported by an upright 12, and adjacent to the free end of the beam an upright 13 has an upper bracket 14 in which the free end of the beam shifts vertically.

Across the upper portion of the bracket 14 is mounted an oscillatory latch member 15, whose trunnions 16 are journaled in the upper side portions of the brackets 14 and whose depending latch piece 17 is adapted for engagement with the upper surface of the free end of the beam 10 so as to prevent the latter from rising off of the lower cross bar 18 of the bracket upon which it normally rests.

This latch member 15 is controlled by an upstanding weight arm 19 at an angle with respect to the depending latch piece 17, which is shiftable to opposite sides of the vertical plane of the latch member, holding the latch piece either in the inactive position shown in full lines in Figure 1 or the active position shown in Figures 2 and 3. Ordinarily however the weight arm 19 which forms in effect a handle for the usual latch, must be grasped and shifted from the position of Figure 1 to the position of Figure 2 after the scale has been used, in order to latch the scale beam in lowered position as in Figures 2 and 3 and this operation thus depends upon the care and watchfulness of the operator.

According to my invention the latch member 15 is provided with a laterally projecting striker arm 20 extending substantially at right angles to the depending latch piece 17 and inwardly along the scale beam 10 so that with the weight arm 19 upon the inner side of the vertical plane of the latch member, the striker arm 20 is in position to be engaged by the scale beam 10 when the latter rises. Upon this engagement the latch member 15 will be rocked until its weight arm 19 is shifted to the outer side of the vertical plane of the latch member so that the latter is free to then shift the latch piece 17 into the effective position when the scale beam again descends.

In this way after each operation the scale beam will be automatically held with its free end lowered against the cross bar 18 of the bracket, the latch member 15 having an endwise projecting lug 21 which works in a cutout portion of one side of the bracket 14, between shoulders 22 and 23 with which it is respectively engageable to arrest movement of the latch member in the positions of Figures 1 and 2.

By thus providing for the automatic latching of the scale beam my invention avoids the necessity of depending upon the watchfulness and care of the operator as well as the great strain upon scales incidental to the chattering of the beam back and forth from the passage of persons, animals and vehicles over the scale platform, in cases where the operator forgets to latch the beam.

I claim:

1. The combination with a scale beam, of a latch member supported adjacent thereto, having means engageable by the scale beam to automatically shift the latch member into effective position when the scale beam rises.

2. The combination with a scale beam, of a latch member shiftable into active position upon the rise of the beam and having means to subsequently lock the beam in lowermost position when the beam again lowers.

3. The combination with a scale beam and an upright at the free end of the beam, of a latch pivotally supported in said upright, having means engageable by the beam to shift the latch to active position when the scale beam rises.

4. The combination with a scale beam and an upright at the free end of the beam, of a gravity latch pivoted in said upright above the beam, having an upstanding weight arm shiftable to opposite sides of its vertical center, said latch member having a depending latch piece for engagement with the scale beam when the said arm is at one side of the vertical center, and having a striker arm for engagement by the scale beam upon upward movement of the latter when the weight arm is at the opposite side of the vertical center and for operation when engaged to shift said arm across said center.

In testimony whereof I have affixed my signature.

JOSEPH J. MAGRADY.